United States Patent Office 3,677,935
Patented July 18, 1972

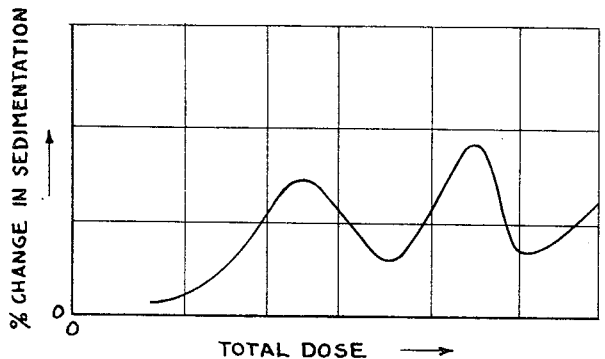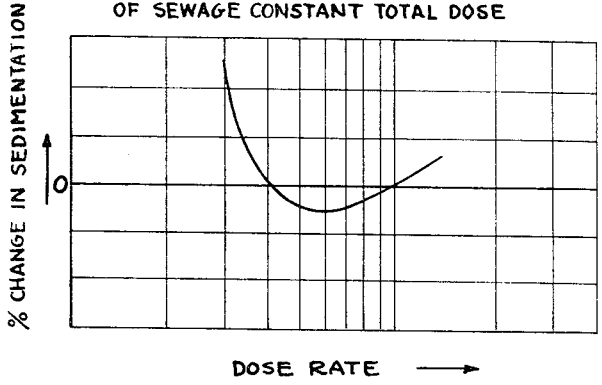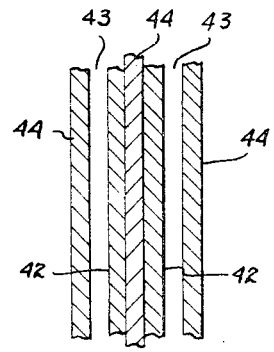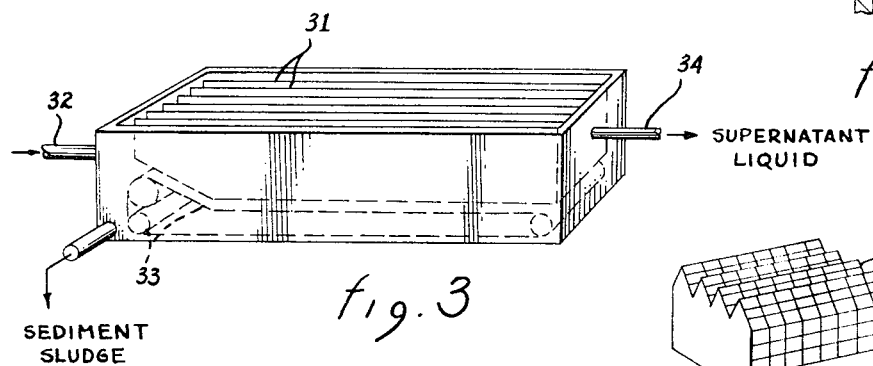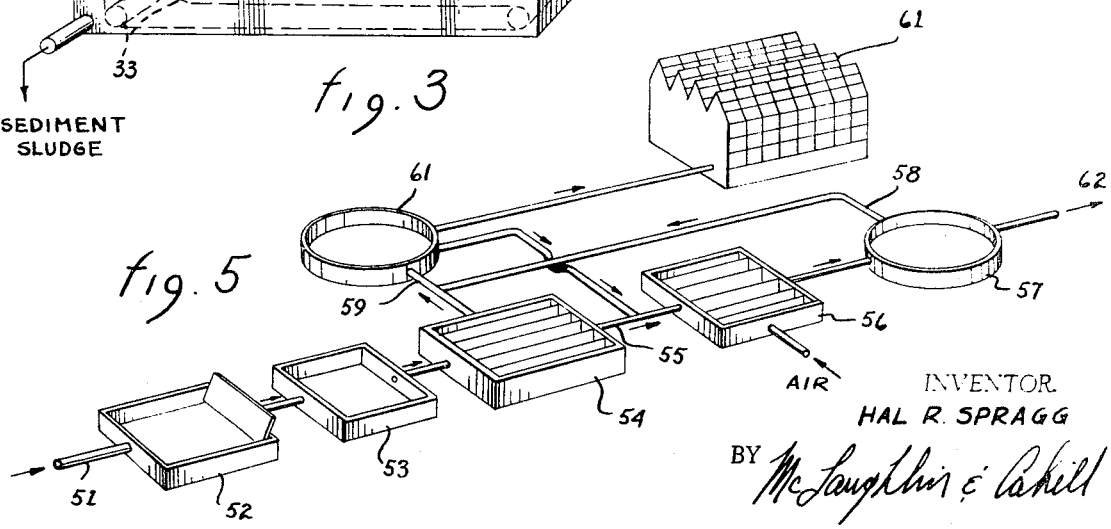

3,677,935
TREATMENT OF SEWAGE
Hal R. Spragg, Phoenix, Ariz., assignor to the United States Atomic Energy Commission
Filed May 4, 1964, Ser. No. 364,376
Int. Cl. C02c 1/02
U.S. Cl. 210—3
5 Claims

ABSTRACT OF THE DISCLOSURE

A method of treating sewage by irradiationg it with $10^3$ to $10^6$ rad of ionizing radiation from X-ray or gamma ray sources, thereby increasing the sedimentation rate of the sewage and degrading organic sewage components, especially synthetic detergents. Radioactive isotopes are the preferred sources of the ionizing radiation.

---

Several types of sewage treatment facilities are in common use today. The type employed in any given situation is dependent upon the characteristics of the sewage being treated, the purity of the effluent required, the population of the area being served, the funds available for construction, etc., and may even utilize a number of variations from so-called standard designs. However, all treatment methods usually have certain similarities. For example, simple sedimentation is generally employed as a primary phase of treatment. Also, digestion of the sediment by bacterial metabolism, commonly called the "activated sludge" treatment, is typically employed in a secondary phase of treatment. Frequently the rate at which the sedimentation occurs or the rate at which the sludge is digested, or both, are the limiting factors in determining the overall capacity of a sewage treatment facility. The recent increase in population and increased rate of pollution of water from industrial sources now dictates that the existing sewage treatment facilities may be utilized to their fullest possible efficiency and that any new facilities constructed have the maximum capability for processing large volumes of sewage and industrial wastes to produce effluent streams which are as pure as possible.

The pollutant content of sewage or industrial waste is generally expressed in terms of the biochemical oxygen demand (BOD). The BOD of ordinary domestic sewage averages from 100–300 p.p.m., but it may vary considerably with the geographical location, season, or time of day or week. When sewage is introduced into a stream, the micro-organisms present in the water metabolize the waste using the dissolved oxygen in the water. Since dissolved oxygen in a stream cannot exceed more than 14 p.p.m. and is seldom more than ½ this concentration, biological oxidation of the wastes results in the depletion of the oxygen content below the 2–4 p.p.m. required for the survival of fish life. Following total depletion of the oxygen, the micro-organisms present will utilize combined oxygen from the nitrate, nitrite, and sulphate ions in the waste, or from the water itself, resulting in the evolution of methane, hydrogen sulfide or other noxious gases. (As used herein the term "BOD" has the meaning ascribed and is measured in accordance with the Austerburg modification of the linkler method.) (See Standard Method for the Examination of Water and Waste Water, American Public Health Association, New York, 11th Edition, page 309 (1960).)

Modern sewage treatment facilities have as important objectives the removal of as much suspended matter as possible by sedimentation techniques and the transformation of the sediment sludge into more innocuous materials by digestion of the sludge employing bacterial metabolism techniques. Aside from the important objectives of removing as much of the pollutant content of the sewage by sedimentation and digestion, an almost equally important objective of modern sewage treatment processes is the removal of refractory or non-biodegradable waste materials which, if not removed, would continue to increase in concentration in the water supply until an intolerable background level is reached. Synthetic detergents are the chief source of such non-biodegradable materials in domestic sewages and industrial wastes. Since these synthetic detergents have superior cleaning powers over common soaps and are effective in either hard or soft water, their desirable characteristics have created consumer acceptance to such an extent that synthetic detergents have almost completely replaced soaps as washing compounds in the home and in most industrial cleaning applications. It has been said that it is not unreasonable to expect that within the next five years "syndets" (synthetic detergents) will comprise 98% of the total cleansing compounds used in the country and that their production will reach four billion pounds of material annually. This increased utilization of syndets has resulted in an increase in problems associated with their disposal, the most obvious and apparent of which is the foaming and frothing occurring in waste waters at treatment facilities and in streams, rivers and canals. Syndets, unlike soaps, are not easily digested by bacteria. In fact, they are virtually unaffected by usual sewage treatment procedures and form soluble compounds with most cations, preventing their sedimentation and digestion. The problems created by detergents for the sanitary engineer can be summarized as (1) the lowering of surface tension of the sewage and the resulting increased wetting of the substances with which the sewage comes in contact, (2) emulsification of grease and oil, (3) dispersion or deflocculation of colloidal matter, (4) floatation and foaming, which reduces oxygen absorption and light penetration, and (5) destruction of bacteria and other living organisms.

The sanitary engineer has attempted to find temporary solutions to the most pressing of these problems by introducing sewage treatment process modifications such as recycling and reseeding and extending process times. These adaptations have been partially successful, but only at a considerable expense and, in addition, the difficulties encountered in sewage treatment represent only one facet of the overall detergent problem. An aspect of larger implication lies in the resistance of these materials to natural bacterial degradation in streams or ground water following their discharge from the sewage treatment process. The predicted increases in detergents used could result in continued accumulation of such syndets in water supplies representing a threat to human welfare. Probably one of the most immediately important and pressing problems created by syndets is the reduction in the capacity of presently existing sewage treatment facilities due to the increased residence times, recycling, etc., necessitated by their presence in the sewage treated in these facilities.

It has now been discovered that the treatment of sewage and industrial waste with ionizing radiation transforms the sewage into a form which is more readily treated in conventional sewage facilities, thereby significantly increasing the capacity of existing facilities or reducing the cost and size of newly constructed facilities required to handle a given volume of sewage and reducing significantly the BOD of the treated effluent. These alterations in the nature of the sewage are principally manifested in four ways, viz., an increase in the sedimentation rate of the sewage, the ability to remove by conventional sedimentation procedures certain components which are not otherwise removed, an increase in the efficiency with which the sediment sludge thus removed is bacterially metabolized, and in the degradation of refractory or non-biodegradable materials such as typical syndets, resulting in reduced foaming tendencies and reduction in the background level of such non-biodegradable materials in the treated effluent from the sewage treatment facility.

The sewage treatment process herein disclosed is applicable generally to any of the typical industrial or domestic wastes commonly encountered, although as will be apparent to those skilled in the art, the sedimentation characteristics and exact chemical compositions of such sewages may vary considerably. For convenience herein, the term "sewage" will be understood to apply either to domestic or industrial wastes and will, in general, indicate sewages having physical and chemical characteristics typical of those reported in the literature. For example, see Balmat, J. L., Chemical Composition and Biochemical Oxidation of Particular Fractions in Domestic Sewage; University Microfilms (Ann Arbor, Mich.) Publication No. 14029, 115 pages (Dissertation Abstract 16,736 (1956); Walters, Leo, Composition of Sewage and Sewage effluents; part 2, Water and Sewage Works, 108, No. 12, 478–481.

In general, any of the known sources of ionizing radiation are effective in practicing the invention herein disclosed. Thus, for example, X-rays and other mechanically produced atomic particles, radioactive isotopes and nuclear reactor waste fuel elements such as the isotopes of the uranium series are suitably employed. The radioactive isotopes and those of the uranium series are the presently preferred sources of ionizing radiation for use in practicing the invention, preferably an isotope having a practical combination of energy characteristics, availability and long half-life. For example, the isotopes having an atomic number from 2 to 83, a half-life preferably in excess of 6 months and an energy of 0.3 m.e.v. or greater. As specific examples of sources of ionizing gamma radiation which are preferably employed in the invention can be mentioned the isotopes cobalt$^{60}$, cesium$^{137}$, strontium$^{90}$, thallium$^{204}$, promethium$^{147}$, europium$^{152}$, krypton$^{85}$ and the uranium series. The choice of the specific isotope to be employed will generally depend upon the type of source, source placement and configuration employed, the desired total dose and dose rate and may be effected to some extent by the nature of the sewage to be treated and the capacity requirements of the sewage treatment facilities.

In practice, a variety of source, source placement and source configuration combinations are suitable. For example, if very high dose rates are desired, then the source is preferably placed around or in the influent pipe of the sedimentation basin, such placement being preferred because of ease of fabrication of the source and minimization of shielding problems and so forth. On the other hand, where low dose rates are desired, according to the preferred practice of the invention, one employs rod or plaque sources disposed within the sedimentation basin as these source configuration and placement combinations avoid the practical fabrication problems arising from the necessity of positioning a large number of point sources symmetrically in an array close enough to give a uniform dose and dose rate to an absorbing media such as aqueous sewage compositions.

For example, in the embodiment chosen for illustration in FIG. 3 the radiation sources 31 are a plurality of plaques disposed lengthwise in a sedimentation basin. The influent sewage enters through the inlet 32 and passes past the source plaques. The sediment sludge fraction is collected at the bottom of the basin and is removed by means of the conveyor system 33. The supernatant fraction is withdrawn through the effluent pipe 34.

In FIG. 4 the source plaques 31 of FIG. 3 are shown in cross-section in greater detail. The source material 41 is contained within a cladding comprising inner cladding plates 42, a void space 43 for the containment of leaks and outer cladding plates 44. This particular design provides maximum safety in operation and containment of leaks and provides the maximum claddings thickness necessary in this type of installation.

FIG. 5 shows a typical activated sludge treatment facility modified by the inclusion of means for irradiating the sewage to increase the capacity of the treatment facility by increasing the sedimentation rate, the total sediment removed increasing the efficiency of biometabolism (digestion) of the sludge and decreasing the syndet foaming tendencies of the sewage and the treated effluent sewage.

As shown in FIG. 5 the raw sewage 51 is first screened 52 and then allowed to settle in a grit chamber 53 to separate non-suspendable matter from the raw sewage. The aqueous component of the sewage, usually containing carbohydrates, lipids, nitrogenous materials and inorganics, is thereafter introduced into a first sedimentation basin 54 of the type shown in FIG. 3 where it is maintained for a length of time sufficient to separate the aqueous component into a first sediment sludge fraction and a supernatant fraction comprising water and a reduced amount of the suspended sewage components. During the sedimentation step the aqueous component of the sewage is irradiated with ionizing radiation at a total dose and at a dose rate sufficient to significantly increase the rate of separation of the first sediment sludge fraction from the supernatant fraction. Where it is desired to even further improve the efficiency of digestion of the sediment sludge, the sludge can be treated with a second source disposed in pipe 59 to give a high absorbed dose prior to seeding the sludge with the digesting bacteria. Apparently this second dose of ionizing radiation aids in further reducing many of the difficultly degradable components of the sludge to a form more rapidly and more easily metabolized by the digesting bacteria. Thereafter, the supernatant fraction 55 is passed through an aeration basin 56 and introduced into a second sedimentation basin 57 where a second sediment sludge fraction 58 is separated from the supernatant fraction. The sediment sludge fractions 58 separated in the first and second sedimentation basins are seeded with digesting bacteria, digested in a digestion tank 60 and dried on a sludge drying bed 61 according to techniques known in the art. The effluent stream 62 is withdrawn from the second settling basin and comprises water and a substantially reduced amount of suspended sewage components.

It is a general characteristic of the invention herein disclosed that the increase in efficiency of sedimentation of sewage appears to be a function of both the total dose of radiation absorbed by the sewage and the dose rate. Thus, as shown in FIG. 1, the curve representing the change in total sedimentation as a function of total dose (at constant dose rate) exhibits a plurality of maxima, and, as shown in FIG. 2, the curve of change in total sedimentation as a function of dose rate (at constant total dose) exhibits a related discontinuity as the dose rate is increased.

The curves of FIGS. 1 and 2 are intended only to show the general trends of the variables as they are displaced by changing the type of sewage being treated, the radiation source characteristics, source placements, etc. Consequently, it is not possible to state with precision the exact optimum dose rate and total dose for the treatment of any particular sewage. However, the specific optimum dose and dose rate to be employed can generally be determined by routine tests by those of ordinary skill having regard for the invention herein disclosed, it being generally desired to employ as low a total dose and dose rate as possible consistent with obtaining the desired transformation of sewage characteristics; higher dose rates and higher total doses will generally increase the costs, necessitate the use of more sophisticated shielding techniques and may even result in undesirable chemical transformation of some of the sewage components. For example, extremely high dose rates may result in the denaturation of proteins, rendering the transformed sewage components more soluble in the aqueous suspension media and resulting in decreased total sedimentation from the sewage.

As a general proposition it can be stated that the total dose (or, stated differently, the retention time in the sedimentation tank) is a function of the dose rate and the desired purity of the treated effluent. Thus, to increase the purity of the effluent from an existing sewage treatment facility, it is generally preferred to employ a minimum dose rate and an increased total dose (or retention time) in the sedimentation tank. On the other hand, to increase the capacity of an existing facility or reduce the size of a new facility required for treating a given volume of sewage, it is generally preferred to employ higher dose rates and reduced total dose (shorter retention time in the sedimentation basin).

In general it is preferred to employ from a dose rate of from about 10 to about 1500 rad/min. and total doses of from about $10^3$ to about $10^6$ rad. For example, domestic sewage from St. Ann, Mo. was successfully treated with ionizing radiation from a cobalt$^{60}$ source at a rate of 1210 rad/min. with a total dose of 110,000 rad. The irradiation treatment increased the total sedimentation from the treated sewage by about 15% during a 15-minute sedimentation period and by about 7.5% during a 60-minute sedimentation period as determined by particle count and particle size determinations made on the supernatant liquid using a Coulter counter.

For a better understanding of the invention and to illustrate the presently preferred embodiments thereof, the following examples are presented.

EXAMPLE 1

This example illustrates the use of ionizing radiation combined with the other conventional components of an activated sludge treatment facility as shown in FIG. 5 to treat the domestic waste flow from a city of 100,000 population, the waste flow having an average organic loading of 200 p.p.m. BOD and a rate of 100 gal./capita/day.

The preliminary treatment includes overflow handling, bar screen and communitors and grit chamber with grit removal and wash. The activated sludge secondary treatment facilities include pipe gallery and related equipment for retention of five to seven hours and the final sedimentation tank is sized for a loading of approximately 1000 gal./ft.$^2$/day. The sludge handling equipment is sized for heated digestion with 5 ft.$^3$/capita capacity and the sludge drying beds are sized for 1.75 ft.$^2$/capita capacity.

Two sedimentation basins are constructed as shown in FIG. 3 and are employed in parallel in place of the single basin 54 of FIG. 5. Each basin is 40 ft. wide, 179 ft. long and 7.8 ft. in effective depth which provides for a surface loading of 700 gal./ft.$^2$/day with a retention time of 2 hours. In each basin is placed a series of forty source plaques arranged 1 foot apart across the width of the basin as shown in FIG. 3. To allow circulation between the plaques and the basin wall, the plaques are designed 6 inches smaller in each dimension than the effective settling area to give a plaque size of 7.3 x 178.5 ft. (1300 sq. ft.). The total plaque area for both basins is 104,000 sq. ft.

The source plaques employed are constructed as shown in FIG. 4. Cesium$^{137}$ is employed as the radiation source at a loading of 9.88 curies/ft.$^2$ to give a dose rate of 10.4 rad/min. The inner steel cladding is 1/16" thick, the air void space is 1/8" and the outer steel cladding is 1/16" thick.

These settling basins, when employed in conjunction with the other conventionally sized elements of an activated sludge treatment facility as shown in FIG. 5 give an average BOD removal of 35% and significantly reduce the syndet foaming tendencies of the treated sewage. The BOD removal rate is 9% higher when the afore-described irradiation treatment is employed than without such treatment. To achieve the same BOD removal rate without irradiation treatment would require that the surface loading of the sedimentation basin be reduced by over 40% or the sedimentation basin size would have to be increased to nearly double its former size.

EXAMPLE 2

To demonstrate the degradation of typical syndets by ionizing radiation in accordance with the invention, a series of aqueous solutions of 10, 35 and 210 p.p.m. were prepared from a standard alkyl benzene sulfonate mixture formulated by the Association of American Soap and Glycerol Products, Inc. to reflect the type of composition which would be encountered in sewage treatment. Similar solutions were made of 100 p.p.m. "Sparkleen," an anionic detergent manufactured by the Calgon Company, 100 p.p.m. "Surf," an anionic detergent manufactured by Lever Brothers Company, and 20 p.p.m. of "Non-Ion-Ox," a nonionic detergent manufactured by Aloe Scientific Company. These samples were irradiated with total doses ranging from a minimum of 1,440 rad for the 10 p.p.m. alkyl benzene sulfonate (ABS) to a maximum of 643,200 rad for the 210 p.p.m. ABS. The ABS (anionic) and the Non-Ion-Ox (nonionic) were irradiated at 296 rad/min. and 1340 rad/min. while the "Sparkleen" and "Surf" (both anionic) were irradiated at the lighter dose rate only.

To determine the foaming tendency of the irradiated samples, 100 ml. of each sample was mixed in a Waring Blendor for 1 minute at low speed and the resulting foam was allowed to stabilize for 1 minute. The foam height was used as an index of foaming tendency and this height was defined as the distance from the liquid-foam interface to the foam-air interface. Solutions which did not form a stable air-foam interface were considered to have no foam.

All of the syndet solutions irradiated displayed a decrease in foaming tendency at all of the dose levels considered. The radiation effects appeared to be more pronounced in the anionic detergents than in the nonionic detergents. The foaming tendencies of the anionic ABS in 35 p.p.m. solution was decreased 63% by a dose of 17,760 rad at 296 rad/min. while the Non-Ion-Ox solutions displayed a foaming tendency decrease of 24% at the same dose and dose rate. Further irradiation, to a dose rate of 35,520 rad at 296 rad/min. reduced the 35 p.p.m. ABS solution to a non-foam condition, while the nonionic detergent displayed no further decrease. At the highest dose and dose rate employed (160,800 rad at 1340 rad/min.) the foaming tendencies of the Non-Ion-Ox solution was reduced to 53% of the control value while the comparable ABS solutions and more concentrated solutions of Sparkleen and Surf were reduced to values ranging from no-foam to 25% of the control value.

Chemical investigations indicate that irradiation of aqueous ABS solutions result in an actual degradation of the ABS molecular structure. Observation of change in pH and methylene blue assay (Standard Methods for the Examination of Water, Sewage and Industrial Wastes, American Public Health Association, New York, 1955) indicate that the degradation of ABS by ionizing radiation proceeds by simultaneous cleavage of the sulfonate group and degradation of the alkyl substituent group.

Having now fully described my invention and the preferred embodiments thereof, I claim:

1. In a method of increasing the sedimentation rate of a sewage comprising
   an aqueous component, and
   a suspensoid component
by irradiating said sewage with ionizing radiation, wherein
   (a) the increase in sedimentation rate as a function of the total radiation dose absorbed by said sewage exhibits a plurality of maxima at total doses characteristic of the particular sewage, and
   (b) the increase in sedimentation rate as a function of the rate at which said radiation is absorbed by said sewage exhibits a minimum at a dose rate characteristic of the particular sewage being treated and generally increasing at dose rates lower and higher than said characteristic rate,
the steps of concurrently
(1) maintaining the total dose of said radiation absorbed by said sewage to provide an increase in sedimentation rate generally corresponding to one of said maxima and
(2) maintaining the dose rate of said radiation absorbed by said sewage to provide an increase in sedimentation rate generally higher than said minimum increase.

2. A process of claim 1 wherein said irradiation with ionizing radiation is carried out by exposing said sewage to a clad gamma radiation source which comprises a radioactive isotope having an atomic number of from two to eighty-three, a half-life in excess of six months, and an energy of at least 0.3 mev.

3. Process of claim 2 wherein said isotope is selected from the class consisting of cobalt$^{60}$, cesium$^{137}$, strontium$^{90}$, thallium$^{204}$, promethium$^{147}$, europium$^{152}$, krypton$^{85}$ and the uranium series.

4. A sewage disposal process comprising:
(a) separating non-suspendible matter from raw sewage;
(b) introducing the aqueous component of said sewage containing suspended sewage components comprising carbohydrates, lipids, nitrogenous materials and inorganics into a sedimentation basin;
(c) maintaining said aqueous component in said sedimentation basin for a time sufficient to separate said aqueous component into a sediment sludge fraction and a supernatant fraction comprising water and a reduced amount of said suspended sewage components;
(d) irradiating said aqueous component of said sewage with ionizing radiation at a combination of total dose and at a dose rate concurrently selected according to steps (1) and (2) of claim 1 to increase the sedimentation rate in said sedimentation basin;
(e) separating said supernatant fraction from said sediment sludge fraction;
(f) digesting and drying said sediment sludge fraction; and
(g) withdrawing from said sedimentation basin an effluent stream comprising water and a substantially reduced amount of suspended sewage components.

5. In an activated sludge sewage treatment process including generally the steps of
(a) separating non-suspendible matter from the liquid component of a sewage,
(b) separating said liquid component in a sedimentation zone into
a sediment sludge fraction, and
a supernant liquid fraction, and
(c) digesting said sludge fraction,
the improvement in said process comprising, in combination with said steps,
(d) treating said sludge fraction after separation thereof from said supernatant fraction with a total dose of ionizing radiation sufficiently high to significantly increase the rate of digestion of said sludge.
said treating being carried out prior to seeding said sludge with digesting bacteria by exposing said sludge to said radiation emanating form a clad source which mechanically separates said source from said sludge.

References Cited
UNITED STATES PATENTS
2,259,688  10/1941  Genter _____ 210—8

OTHER REFERENCES

Sawyer et al., Biochemical Behavior of Synthetic Detergents, Ind. and Eng. Chem., vol. 48, February 1956, pp. 236–240.

Narver, Is Sterilization of Sewage by Irradiation Economical?, Civil Engineering, September 1957, pp. 54–55.

Nuclear Science Abstracts, Vol. 15, No. 23 (TID–13868).

Nuclear Science Abstracts, Vol. 16, No. 12A (TID–15389).

Nuclear Science Abstracts, Vol. 17, No. 2 (TID–16998).

Grune et al., Radioactivity and Digestion, Jour. WPCF, Vol. 35, April 1963, pp. 493–531, pp. 493–495 and 528–529 particularly relied on.

Atomic Radiation in Wastewater Treatment, Jour. WPCF, August 1963, Vol. 35, p. 1080.

By-Product Recovery of Atomic Energy Wastes to Treat Colloidal Systems and Suspensions, Industrial Water and Wastes, September-October 1963, p. 33.

Edelmann, Some Possible Applications of Nuclear Energy to Problems of Disposal of Industrial Wastes, Proceedings, Thirteenth Industrial Waste Conference, Purdue University (1958), pp. 625–629.

MICHAEL ROGERS, Primary Examiner

U.S. Cl. X.R.

204—154; 210—1, 13, 16, 152